United States Patent [19]
Nishimura et al.

[11] Patent Number: 6,040,388
[45] Date of Patent: Mar. 21, 2000

[54] COPOLYMER, HYDROGENATED PRODUCT THEREOF, AND PROCESS FOR PRODUCING THE SAME

[75] Inventors: Koichi Nishimura, Kawasaki; Tatsuya Kawamura; Toyozo Fujioka, both of Tokuyama, all of Japan

[73] Assignee: Idemitsu Petrochemical Co., Ltd., Tokyo, Japan

[21] Appl. No.: 08/966,439

[22] Filed: Nov. 10, 1997

[30] Foreign Application Priority Data

Nov. 27, 1996 [JP] Japan .................................. 8-330225
Aug. 25, 1997 [JP] Japan .................................. 9-241686

[51] Int. Cl.$^7$ ...................................... C08F 32/00
[52] U.S. Cl. ........................ 525/332.1; 525/338; 525/940
[58] Field of Search ................................ 525/332.1, 338, 525/940

[56] References Cited

FOREIGN PATENT DOCUMENTS

| | | |
|---|---|---|
| 0 708 121 | 4/1996 | European Pat. Off. . |
| 61-1442 | 1/1986 | Japan . |
| 7-88412 | 9/1995 | Japan . |

OTHER PUBLICATIONS

DATABASE WPI, Derwent Publications Ltd., London, GB, AN of JP 01 051 416 A (2–1989) and JP 7–88412 B (9–1995).

*Primary Examiner*—Melvyn I. Marquis
*Assistant Examiner*—D. Aylward
*Attorney, Agent, or Firm*—Frishauf, Holtz, Goodman, Langer & Chick, P.C.

[57] ABSTRACT

A hydrogenated product of a copolymer of cyclopentadiene and/or dicyclopentadiene and a vinyl-substituted aromatic compound. The copolymer has a softening point of from 60 to 130° C., a vinyl-substituted aromatic compound content of from 30 to 90% by weight, a bromine number of from 30 to 90 g/100 g, a number average molecular weight of from 400 to 1,000, and a weight average molecular weight/number average molecular weight (Mw/Mn) ratio of 2.5 or less. The hydrogenated product has a softening point of 60 to 130° C., a vinyl-substituted aromatic compound content of 0 to 35% by weight, a bromine number of 0 to 300 g/100 g, a number average molecular weight of 400 to 1,000 and a weight average molecular weight/number average molecular weight ratio of 2.5 or less. The hydrogenated product is useful as a substrate in the production of a tackifier and an adhesive.

14 Claims, 4 Drawing Sheets

COPOLYMER, HYDROGENATED PRODUCT THEREOF, AND PROCESS FOR PRODUCING THE SAME

FIELD OF THE INVENTION

The present invention relates to a copolymer of cyclopentadiene and/or dicyclopentadiene and a vinyl-substituted aromatic compound, the hydrogenated product thereof, and a process for producing the same. More specifically, the present invention relates to a copolymer of cyclopentadiene and/or dicyclopentadiene and a vinyl-substituted aromatic compound having a sharp molecular weight distribution, namely, a low weight average molecular weight (hereinafter abbreviated as "Mw")/number average molecular weight (hereinafter abbreviated as "Mn") ratio, a hydrogenated product thereof, and a process for producing the same.

PRIOR ART

It has been known that a copolymer of cyclopentadiene and/or dicyclopentadiene (hereinafter sometimes referred to as "(di)cyclopentadiene") and a vinyl-substituted aromatic compound is useful as a substrate of an adhesive, a tackifier, a paint or the like.

This copolymer has been produced so far by mixing (di)cyclopentadiene with a vinyl-substituted aromatic compound in a solvent such as xylene or the like for copolymerization (Japanese Patent Publication No. 1442/1986).

The copolymer obtained by this method exhibits, however, an Mw/Mn ratio of more than 5, having a broad molecular weight distribution. Accordingly, this copolymer shows quite a high melt viscosity. When it is incorporated into, for example, an ethylene-vinyl acetate copolymer to form a hot-melt tackifier or adhesive, a workability is poor disadvantageously.

To cope with this drawback associated with the conventional method, the present Applicant proposed a process in which the heat polymerization is conducted by adding dropwise (in divided portions) a mixture of (di)cyclopentadiene and a vinyl-substituted aromatic compound to a solvent such as xylene or the like (Japanese Patent Publication No. 88412/1995).

This process can give a sharper molecular weight distribution than the method in which the heat polymerization is conducted by charging the mixture of (di)cyclopentadiene and the vinyl-substituted compound into the solvent.

The copolymer obtained by this process exhibits indeed an Mw/Mn ratio of 5 or less which is lower than the copolymer obtained by the conventional method, but this ratio is actually approximately 2.8 as will be shown in Examples, and the value is not always/necessarily satisfactory at present. When this copolymer is used as a starting material of a tackifier or an adhesive, a melt viscosity is not altogether satisfactory. Accordingly, its solution has been in demand.

SUMMARY OF THE INVENTION

The present invention aims to provide a copolymer of (di)cyclopentadiene and a vinyl-substituted aromatic compound which has a sharper molecular weight distribution and by which it is possible to solve the above-mentioned problems of the conventional method and to produce a higher-performance tackifier or adhesive, a hydrogenated product thereof, and a process for producing the same.

In order to solve the above-mentioned problems of the conventional method, the present inventors have conducted assiduous investigations. Consequently, they have found that when the copolymerization is conducted by adding a mixture of (di)cyclopentadiene and a vinyl-substituted aromatic compound to a solvent at a specific ratio based on a total amount of (di)cyclopentadiene and the vinyl-substituted aromatic compound as starting monomers in divided portions, an Mw/Mn ratio of the resulting copolymer is surprisingly reduced to 2.5 or less.

Further, the present inventors have found that when (1) a sulfur compound or (2) at least one compound selected from a group consisting of a hydroxybenzene compound, a hydroxynaphthalene compound and a quinone compound is caused to exist in adding a mixture of (di)cyclopentadiene and a vinyl-substituted aromatic compound to a solvent in divided portions, the Mw/Mn ratio of the resulting copolymer is more reduced to less than 1.9.

These findings have led to the completion of the present invention.

That is, the first invention is to provide a copolymer of cyclopentadiene and/or dicyclopentadiene and a vinyl-substituted aromatic compound, said copolymer having a softening point of from 60 to 130° C., a vinyl-substituted aromatic compound content of from 30 to 90% by weight, a bromine number of from 30 to 90 g/100 g, a number average molecular weight of from 400 to 1,000, and a weight average molecular weight/number average molecular weight (Mw/Mn) ratio of 2.5 or less.

The second invention is to provide a process for producing the copolymer of the first invention, which comprises conducting the copolymerization while adding a mixture of cyclopentadiene and/or dicyclopentadiene and a vinyl-substituted aromatic compound to a solvent in divided portions to produce a copolymer of cyclopentadiene and/or dicyclopentadiene and the vinyl-substituted aromatic compound, wherein the solvent is used in an amount of from 50 to 500 parts by weight per 100 parts by weight in total of cyclopentadiene and/or dicyclopentadiene and the vinyl-substituted aromatic compound.

The third invention is to provide a hydrogenated product of a copolymer of cyclopentadiene and/or dicyclopentadiene and a vinyl-substituted aromatic compound which is obtained by hydrogenating the copolymer of the first invention, and which has a softening point of from 70 to 140° C., a vinyl-substituted aromatic compound content of from 0 to 35% by weight, a bromine number of from 0 to 30 g/100 g, a number average molecular weight of from 400 to 1,000, and a weight average molecular weight/number average molecular weight (Mw/Mn) ratio of 2.5 or less.

The fourth invention is to provide a process for producing the hydrogenated product of the copolymer of the third invention, which comprises conducting the copolymerization while adding a mixture of cyclopentadiene and/or dicyclopentadiene and a vinyl-substituted aromatic compound to a solvent in divided portions, and then conducting the hydrogenation to produce a hydrogenated product of a copolymer of cyclopentadiene and/or dicyclopentadiene and the vinyl-substituted aromatic compound, wherein the solvent is used in an amount of from 50 to 500 parts by weight per 100 parts by weight in total of cyclopentadiene and/or dicyclopentadiene and the vinyl-substituted aromatic compound. This fourth invention is provided by adding the hydrogenation step to the second invention.

The fifth invention is to provide a copolymer of cyclopentadiene and/or dicyclopentadiene and a vinyl-substituted aromatic compound, the copolymer having a softening point of from 60 to 130° C., a vinyl-substituted aromatic compound content of from 30 to 90% by weight, a bromine number of from 30 to 90 g/100 g, a number average molecular weight of from 400 to 1,000, and a weight average molecular weight/number average molecular weight (Mw/Mn) ratio of less than 1.9.

The sixth invention is to provide a process for producing the copolymer of the fifth invention, which comprises conducting the copolymerization while adding a mixture of cyclopentadiene and/or dicyclopentadiene and a vinyl-substituted aromatic compound to a solvent in divided portions to produce a copolymer of cyclopentadiene and/or dicyclopentadiene and the vinyl-substituted aromatic compound, wherein a sulfur compound is caused to exist in the addition in divided portions.

The seventh invention is to provide a process for producing the copolymer of the fifth invention, which comprises conducting the copolymerization while adding a mixture of cyclopentadiene and/or dicyclopentadiene and a vinyl-substituted aromatic compound to a solvent in divided portions to produce a copolymer of cyclopentadiene and/or dicyclopentadiene and the vinyl-substituted aromatic compound, wherein at least one compound selected from the group consisting of a hydroxybenzene compound, a hydroxynaphthalene compound and a quinone compound is caused to exist in the addition in divided portions.

The eighth invention is to provide a hydrogenated product of a copolymer of cyclopentadiene and/or dicyclopentadiene and a vinyl-substituted compound which is obtained by hydrogenating the copolymer of the fifth invention, and which has a softening point of from 70 to 140° C., a vinyl-substituted aromatic compound content of from 0 to 35% by weight, a bromine number of from 0 to 30 g/100 g, a number average molecular weight of from 400 to 1,000, and a weight average molecular weight/number average molecular weight (Mw/Mn) ratio of less than 1.9.

The ninth invention is to provide a process for producing the hydrogenated product of the copolymer in the eighth invention, which comprises conducting the copolymerization while adding a mixture of cyclopentadiene and/or dicyclopentadiene and a vinyl-substituted aromatic compound to a solvent in divided portions, and then conducting the hydrogenation to produce a hydrogenated product of a copolymer of cyclopentadiene and/or dicyclopentadiene and the vinyl-substituted aromatic compound, wherein a sulfur compound is caused to exist in the addition in divided portions. The ninth invention is provided by adding the hydrogenation step to the sixth invention.

Finally, the tenth invention is to provide a process for producing the hydrogenated product of the copolymer in the eighth invention, which comprises conducting the copolymerization while adding a mixture of cyclopentadiene and/or dicyclopentadiene and a vinyl-substituted aromatic compound to a solvent in divided portions, and then conducting the hydrogenation to produce a hydrogenated product of a copolymer of cyclopentadiene and/or dicyclopentadiene and the vinyl-substituted aromatic compound, wherein at least one compound selected from the group consisting of a hydroxybenzene compound, a hydroxynaphthalene compound and a quinone compound is caused to exist in the addition in divided portions. This tenth invention is provided by adding the hydrogenation step to the seventh invention.

DETAILED DESCRIPTION OF THE INVENTION

The copolymer in the first invention and the hydrogenated product of the copolymer in the third invention are obtained by the processes in the second and fourth inventions respectively. These are the copolymer and the hydrogenated product of the copolymer of (di)cyclopentadiene and the vinyl-substituted aromatic compound both having the Mw/Mn ratio of 2.5 or less.

In the copolymer of (di)cyclopentadiene and the vinyl-substituted aromatic compound in the first invention, a softening point is between 60 and 130° C., preferably between 70 and 120° C.; a vinyl-substituted aromatic compound content is between 30 and 90% by weight, preferably between 35 and 65% by weight, more preferably between 40 and 60% by weight; a bromine number is between 30 and 90 g/100 g, preferably between 30 and 70 g/100 g, more preferably between 40 and 60 g/100 g; and a number average molecular weight is between 400 and 1,000, preferably between 500 and 800.

The hydrogenated copolymer of (di)cyclopentadiene and the vinyl-substituted aromatic compound in the third invention is obtained by hydrogenating the copolymer in the first invention. In this hydrogenated copolymer, a softening point is between 70 and 140° C., preferably between 80 and 130° C.; a vinyl-substituted aromatic compound content is between 0 and 35% by weight, preferably between 1 and 30% by weight; a bromine number is between 0 and 30 g/100 g, preferably between 1 and 20 g/100 g; and a number average molecular weight is between 400 and 1,000, preferably 500 and 800.

Figure 1:
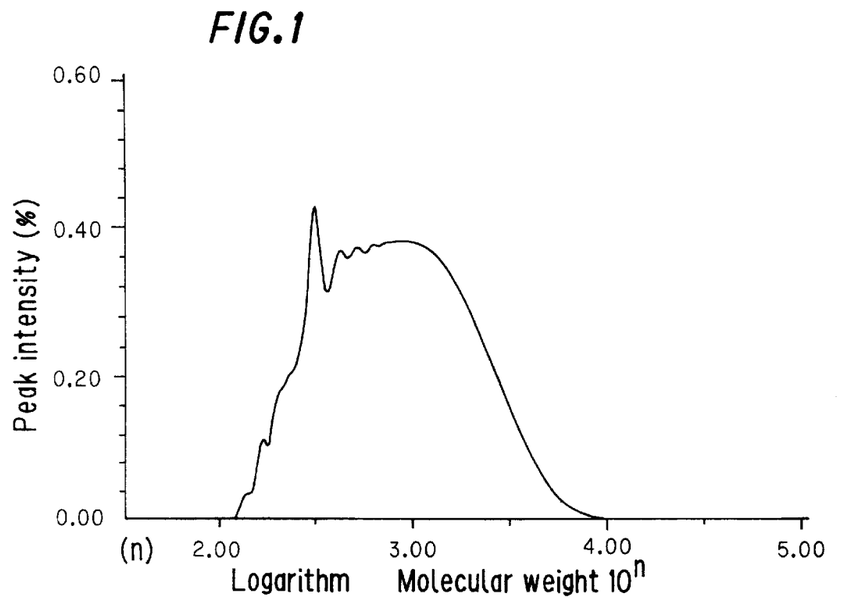
FIG. 1 is a pattern of a molecular weight distribution, as measured by GPC, of a copolymer in the present invention.

Since both the copolymer of (di) cyclopentadiene and the vinyl-substituted aromatic compound in the first invention and the hydrogenated product thereof in the third invention have the Mw/Mn ratio of 2.5 or less, the molecular weight distribution is sharp. For example, the molecular weight distribution measured by Gel Permeation Chromatography (GPC) gives a pattern shown in FIG. 1.

In the copolymer of (di)cyclopentadiene and the vinyl-substituted aromatic compound in the first invention, the Mw/Mn ratio is 2.5 or less, for example, around 2.0 as will be described later in Example 1.

In the hydrogenated product of the copolymer of (di) cyclopentadiene and the vinyl-substituted aromatic compound in the third invention, the Mw/Mn ratio is 2.5 or less, for example, around 1.9 as will be described later in Example 2.

Figure 2:
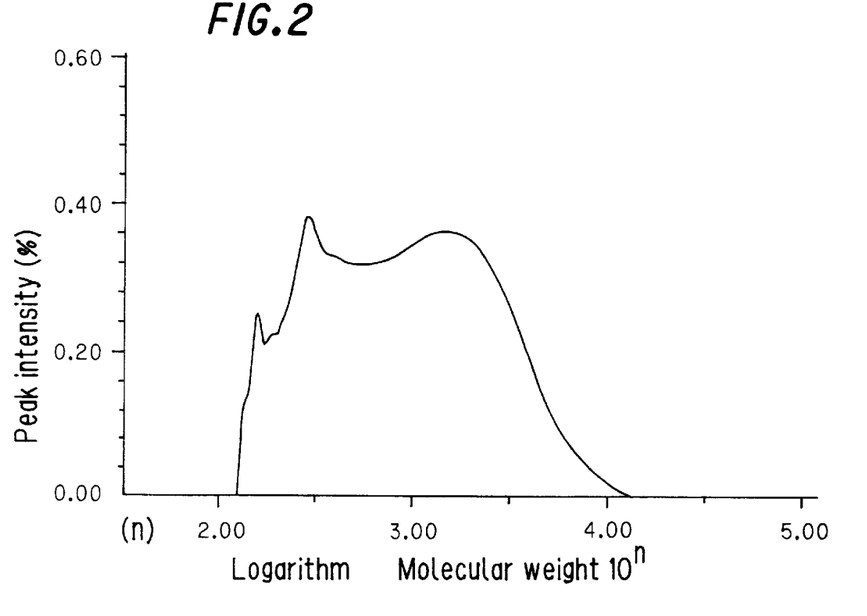
FIG. 2 is a pattern of a molecular weight distribution, as measured by GPC, of a conventional copolymer.

Meanwhile, in the copolymer of (di)cyclopentadiene and the vinyl-substituted aromatic compound obtained by the conventional method, the Mw/Mn ratio exceeds 2.5 (it is approximately 2.8 as will be described later in Comparative Examples). The molecular weight distribution of this copolymer as measured by GPC gives a pattern shown in FIG. 2, and it is a broad molecular weight distribution.

The copolymer in the first invention and the hydrogenated product thereof in the third invention are obtained by the processes of the second and fourth inventions respectively.

The copolymer in the first invention can be produced at good efficiency by the process of the second invention.

That is, as described in the second invention, the copolymer in the first invention can be produced by conducting the copolymerization while adding the mixture of (di)cyclopentadiene and the vinyl-substituted aromatic compound to the solvent in divided portions to produce the copolymer of (di)cyclopentadiene and the vinyl-substituted aromatic compound, wherein the solvent is used in an amount of from 50 to 500 parts by weight per 100 parts by weight in total of (di)cyclopentadiene and the vinyl-substituted aromatic compound.

The solvent is used in the copolymerization according to the present invention. Examples of the solvent include benzene, toluene, xylene, cyclohexane, methylcyclohexane and ethylcyclohexane. They can be used either singly or in combination.

It is advisable to use these solvents after being heated at 100° C. or more, preferably at 150° C. or more.

In the present invention, the amount of the solvent is between 50 and 500 parts by weight, preferably between 80 and 300 parts by weight per 100 parts by weight of the mixture of (di)cyclopentadiene and the vinyl-substituted aromatic compound (for example, styrene, α-methylstyrene or vinyltoluene) as starting monomers.

When the amount of the solvent used is less than the above-mentioned range, it is impossible to produce the desired copolymer or hydrogenated product thereof having the sharp molecular weight distribution. Meanwhile, even when the amount of the solvent used exceeds the above-mentioned range, the effect of sharpening the molecular weight distribution is no longer increased, and the amount of the product produced in one batch is rather decreased disadvantageously.

The use of the solvent in such a specific range and the excellent effect of the present invention thereby brought forth have heretofore not been known at all.

The copolymerization is conducted while adding the mixture of (di)cyclopentadiene and the vinyl-substituted aromatic compound to the solvent (preferably to the heated solvent) in divided portions (for example, dropwise).

The mixing ratio of (di)cyclopentadiene and the vinyl-substituted aromatic compound is not particularly limited. The weight ratio of (di)cyclopentadiene to vinyl-substituted aromatic compound is usually between 70:30 and 20:80, preferably between 60:40 and 40:60.

The time of the addition in divided portions is usually between 0.5 and 5 hours, preferably between 1 and 3 hours. It is preferable that the proportions of these compounds to be added are equal.

It is advisable that the copolymerization is conducted successively even after the addition of (di)cyclopentadiene and the vinyl-substituted aromatic compound in divided portions is completed.

In this case, the reaction conditions are not particularly limited. Usually, the reaction temperature is between 200 and 350° C., preferably between 250 and 300° C., the reaction pressure is between 0 and 20 kg/cm$^2$G, preferably between 0 and 15 kg/cm$^2$G, and the reaction time is between 0.5 and 8 hours, preferably between 1 and 5 hours.

Subsequently, when the resulting reaction solution is treated, for example, at a temperature of from 100 to 300° C., a pressure of from 100 to 1 mmHg for from 1 to 3 hours to remove volatile matters and the like, the copolymer in the first invention can be obtained.

The copolymer of (di)cyclopentadiene and the vinyl-substituted aromatic compound has, as described in the first invention, a softening point of from 60 to 130° C., a vinyl-substituted aromatic compound content of from 30 to 90% by weight, a bromine number of from 30 to 90 g/100 g, a number average molecular weight of from 400 to 1,000, and an Mw/Mn ratio of 2.5 or less (2.0 in Example 1 to be described later). Thus, the copolymer having the sharp molecular weight distribution is provided.

The hydrogenated product of the copolymer in the third invention can be produced at good efficiency by the process in the fourth invention. As mentioned above, it is obtained by hydrogenating a copolymer in the first invention produced by the process in the second invention.

That is, the hydrogenated product of the copolymer in the third invention can be formed by conducting the same copolymerization as described in the first invention according to the process in the second invention, and then conducting the hydrogenation.

Further, the copolymer in the first invention which has been already obtained may be subjected to the hydrogenation.

In this case, the hydrogenation is carried out in a solvent such as cyclohexane or tetrahydrofuran in the presence of a nickel, palladium, cobalt, platinum or rhodium catalyst. At this time, the reaction temperature is between 120 and 300° C., preferably between 150 and 250° C., the reaction time is between 1 and 7 hours, preferably between 2 and 5 hours, and the hydrogen pressure is between 10 and 60 kg/cm$^2$G, preferably between 20 and 50 kg/cm$^2$G.

When the reaction solution obtained by such a hydrogenation is treated, for example, at a temperature of from 100 to 300° C, a pressure of from 100 and 1 mmHg for from 1 to 3 hours as in producing the copolymer to remove volatile matters and the like, the hydrogenated product of the copolymer in the third invention can be obtained.

The hydrogenated product of the copolymer of (di)cyclopentadiene and the vinyl-substituted aromatic compound obtained by the process in the fourth invention has, as described in the third invention, a softening point of from 70 to 140° C., a vinyl-substituted aromatic compound content of from 0 to 35% by weight, a bromine number of from 0 to 30 g/100 g, a number average molecular weight of from 400 to 1,000, and an Mw/Mn ratio of 2.5 or less (1.9 in Example 2 to be described later). Thus, a hydrogenated product of the copolymer having the sharp molecular weight distribution is provided.

The copolymer in the fifth invention is obtained by the process in the sixth or seventh invention, and it is the copolymer of (di)cyclopentadiene and the vinyl-substituted aromatic compound having the Mw/Mn ratio of less than 1.9.

The hydrogenated product of the copolymer in the eighth invention is obtained by the process in the ninth or tenth invention, and it is the hydrogenated product of the copolymer of (di)cyclopentadiene and the vinyl-substituted aromatic compound having the Mw/Mn ratio of less than 1.9. The hydrogenated product of the copolymer in the eighth invention is the hydrogenated product of the copolymer in the fifth invention.

Of these, the copolymer of (di)cyclopentadiene and the vinyl-substituted aromatic compound in the fifth invention is the same as the copolymer in the above-mentioned first invention except that the Mn/Mn ratio is less than 1.9.

That is, in the copolymer of the fifth invention, the softening point is between 60 and 130° C., preferably between 70 and 120° C.; the vinyl-substituted aromatic compound content is between 30 and 90% by weight, preferably between 35 and 65% by weight, more preferably between 40 and 60% by weight; the bromine number is between 30 and 90 g/100 g, preferably between 30 and 70 g/100 g, preferably between 40 and 60 g/100 g; and the number average molecular weight is between 400 and 1,000, preferably between 500 and 800.

The hydrogenated product of the copolymer of (di) cyclopentadiene and the vinyl-substituted aromatic compound in the eighth invention is the same as the hydrogenated product of the copolymer in the third invention except that the Mw/Mn ratio is less than 1.9. In this hydrogenated product of the copolymer, the softening point is between 70 and 140° C., preferably between 80 and 130° C.; the vinyl-substituted aromatic compound content is between 0 and 35% by weight, preferably between 1 and 30% by weight; the bromine number is between 0 and 30 g/100 g, preferably between 1 and 20 g/100 g; and the number average molecular weight is between 400 and 1,000, preferably between 500 and 800.

Since both the copolymer of (di)cyclopentadiene and the vinyl-substituted aromatic compound in the fifth invention and the hydrogenated product of the copolymer in the eighth invention have the Mw/Mn ratio of less than 1.9, the molecular weight distribution is even sharper. For example, the molecular weight distribution measured by GPC gives a pattern shown in FIG. 3.

In the copolymer of (di)cyclopentadiene and the vinyl-substituted aromatic compound in the fifth invention and the hydrogenated product of the copolymer in the eighth invention, the Mw/Mn ratio is reduced to less than 1.9, and the molecular weight distribution thereof is even sharper than that of the copolymer in the first invention or the hydrogenated product of the copolymer in the third invention.

Especially, in the copolymer of (di)cyclopentadiene and the vinyl-substituted aromatic compound in the fifth invention which is obtained by the process in the sixth invention and the hydrogenated product of the copolymer in the eighth invention obtained by the process in the ninth invention, the Mw/Mn ratio is reduced to approximately from 1.6 to 1.7 (for instance, as shown in Examples 3 and 4).

The copolymer in the fifth invention is obtained by the process in the sixth or seventh invention, and the hydrogenated product of the copolymer in the eighth invention by the process of the ninth or tenth invention respectively.

The copolymer in the fifth invention can be produced at good efficiency by the process in the sixth or seventh invention.

That is, the copolymer in the fifth invention can be produced, as described in the sixth invention, such that the copolymerization is conducted while adding a mixture of cyclopentadiene and/or dicyclopentadiene and a vinyl-substituted aromatic compound to a solvent in divided portions to produce a copolymer of cyclopentadiene and/or dicyclopentadiene and the vinyl-substituted aromatic compound, wherein a sulfur compound is caused to exist in the addition in divided portions.

The solvent here referred to is the same as described in the first to fourth inventions.

The amount of the solvent to be used is also the same as described in the first to fourth inventions [between 50 and 500 parts by weight per 100 parts by weight of the mixture of (di)cyclopentadiene and the vinyl-substituted aromatic compound as starting monomers]. However, since the sulfur compound is caused to exist in adding the mixture of (di)cyclopentadiene and the vinyl-substituted aromatic compound to the solvent in divided portions, the amount of the solvent to be used can be reduced more. It is usually between 50 and 150 parts by weight, preferably between 70 and 120 parts by weight per 100 parts by weight of the starting monomers.

The mixing ratio of (di)cyclopentadiene and the vinyl-substituted aromatic compound and the period of time for adding the mixture in divided portions are the same as described in the first to fourth inventions.

In the sixth invention, the copolymerization is conducted while adding the mixture of (di)cyclopentadiene and the vinyl-substituted aromatic compound to the solvent in divided portions to produce the copolymer of (di) cyclopentadiene and the vinyl-substituted aromatic compound, wherein the sulfur compound is caused to exist in the addition in divided portions to the solvent. The sixth invention is basically the same as the second invention except that the sulfur compound is caused to exist.

As the sulfur compound, a compound which is generally used as a chain transfer agent can be used. Examples thereof include n-octylmercaptan, benzylmercaptan, thiophenol and 2-methyl-5-tert-butylthiophenol.

The amount of the sulfur compound used is 5 parts by weight or less, usually between 0.01 and 5 parts by weight, preferably between 0.1 and 2 parts by weight per 100 parts by weight of the mixture of (di)cyclopentadiene and the vinyl-substituted aromatic compound as starting monomers.

When the amount of the sulfur compound used is less than the above-mentioned range, the molecular weight distribution of the resulting copolymer is broadened, making it impossible to obtain a resin having an improved performance while maintaining a high productivity. Meanwhile, even when the amount of the solvent used exceeds the above-mentioned range, the effect is no longer increased, and the productivity in one batch is rather decreased. Thus, it is undesirous.

The state of the sulfur compound present is not particularly limited. For example, the sulfur compound which has been incorporated into the starting monomers may be dropped to the solvent in divided portions, or it is also possible that the sulfur compound has been caused to exist in the solvent (mixed with the solvent) and the starting monomers are added thereto dropwise.

In the sixth invention, the copolymer in the fifth invention can basically be produced in the same manner as in the second invention except that the sulfur compound is caused to exist as mentioned above.

As described in the seventh invention, the copolymer in the fifth invention can also be produced such that the copolymerization is conducted while adding a mixture of cyclopentadiene and/or dicyclopentadiene and a vinyl-substituted aromatic compound to a solvent in divided portions to produce a copolymer of cyclopentadiene and/or dicyclopentadiene and the vinyl-substituted aromatic compound, wherein at least one compound selected from the group consisting of a hydroxybenzene compound, a hydroxynaphthalene compound and a quinone compound is caused to exist in the addition of the mixture of (di)cyclopentadiene and the vinyl-substituted aromatic compound to the solvent in divided portions.

The process in the seventh invention is the same as the process in the sixth invention except that at least one compound selected from a hydroxybenzene compound, a hydroxynaphthalene compound and a quinone compound is caused to exist instead of the sulfur compound in the addition in divided portions.

Examples of the hydroxybenzene compound include phenol, 2,6-di-tert-butyl-p-cresol, pentaerythrityltetrakis(3-(3,5-di-tert-butyl-4-hydroxyphenyl)propionate), methoquinone, hydroquinone, 2,5-di-tert-butylhydroquinone, hydroxyhydroquinone, catechol, p-tert-butyl-catechol and pyrogallol.

Of these, hydroxyhydroquinone, catechol, p-tert-butyl-catechol and pyrogallol are preferable.

Examples of the hydroxynaphthalene compound include 1,4-dihydroxynaphthalene, 2,3-dihydroxynaphthalene, 2,4-dihydroxynaphthalene, 2,6-dihydroxynaphthalene and 3,4-dihydroxynaphthalene.

Examples of the quinone compound include 1,4-benzoquinone, α-naphthoquinone, anthraquinone and 1,4-dihydroxyanthraquinone.

In the seventh invention, at least one, i.e. one or more compound selected from the group consisting of the above-mentioned hydroxybenzene compound, hydroxynaphthalene compound and quinone compound can be used. Of these, the hydroxybenzene compound is preferable, and hydroxyhydroquinone, catechol, p-tert-butylcatechol and pyrogallol are especially preferable.

The amount of at least one compound to be used selected from the group consisting of the above-mentioned hydroxybenzene compound, hydroxynaphthalene compound and quinone compound is 5 parts by weight or less, usually between 0.01 and 5 parts by weight, preferably between 0.1 and 2 parts by weight per 100 parts by weight of the mixture of (di)cyclopentadiene and the vinyl-substituted aromatic compound as starting monomers.

When the amount of the above-mentioned compound used is less than the above-mentioned range, the molecular weight distribution of the resulting copolymer is broadened, making it impossible to obtain a resin having an improved performance while maintaining a high productivity. On the other hand, even when the amount of the solvent used exceeds the above-mentioned range, the effect is no longer increased, and the productivity in one batch is rather decreased. Thus, it is undesirous.

As stated above, the process in the seventh invention is the same as the process in the sixth invention except that at least one compound selected from the group consisting of above-mentioned hydroxybenzene compound, hydroxynaphthalene compound and quinone compound is caused to exist instead of the sulfur compound in the addition in divided portions.

The state of at least one compound selected from the group consisting of the hydroxybenzene compound, the hydroxynaphthalene compound and the quinone compound is, like the state of the sulfur compound, not particularly limited.

It is advisable that the copolymerization in the process of the seventh invention is successively conducted, like the copolymerization in the process of the sixth invention, even after the addition of the mixture of (di)cyclopentadiene and the vinyl-substituted aromatic compound in divided portions is completed, and the reaction conditions at this time are the same as in the process of the sixth invention. In this manner, the copolymer in the fifth invention can be produced.

In the copolymer of (di)cyclopentadiene and the vinyl-substituted aromatic compound produced by the seventh invention, the Mw/Mn ratio is between 1.79 and 1.89 being less than 1.9, as demonstrated in Examples. Thus, the molecular weight distribution is sharp. For example, the molecular weight distribution measured by GPC gives patterns shown in FIGS. 4 to 7.

The hydrogenated product of the copolymer in the eighth invention can be obtained by the process in the ninth or tenth invention. It is a hydrogenated product of the copolymer in the fifth invention.

In the ninth invention, the copolymerization is conducted while adding a mixture of (di)cyclopentadiene and a vinyl-substituted aromatic compound to a solvent in divided portions, and the hydrogenation is then conducted to produce a hydrogenated product of a copolymer of (di)cyclopentadiene and the vinyl-substituted aromatic compound, wherein a sulfur compound is caused to exist in the addition of the mixture to the solvent in divided portions. The same copolymerization as in obtaining the copolymer of the sixth invention is conducted, and the hydrogenation is then conducted. The ninth invention is basically the same as the fourth invention except that the sulfur compound is caused to exist in the addition in divided portions.

According to the sixth invention or the ninth invention, the sulfur compound is caused to exist in adding the above-mentioned mixture to the solvent in divided portions, making it possible to further sharpen the molecular weight distribution of the resulting copolymer or hydrogenated product of the copolymer.

Both the thus-obtained copolymer of (di)cyclopentadiene and the vinyl-substituted aromatic compound in the fifth invention and the hydrogenated product of the copolymer in the eighth invention have the Mw/Mn ratio of less than 1.9 (1.67 and 1.63 in Examples to be described later), and the molecular weight distribution is even sharper.

In the tenth invention, the hydrogenated product of the copolymer of (di)cyclopentadiene and the vinyl-substituted aromatic compound is produced by conducting the copolymerization while adding a mixture of (di)cyclopentadiene and the vinyl-substituted aromatic compound to the solvent in divided portions and then conducting the hydrogenation, wherein at least one compound selected from the group consisting of a hydroxybenzene compound, a hydroxynaphthalene compound and a quinone compound is caused to exist in the addition in divided portions.

That is, the tenth invention is provided by adding the hydrogenation reaction to the process in the above-mentioned seventh invention.

In other words, the process in the tenth invention is the same as the process in the ninth invention except that at least one compound selected from the group consisting of the above-mentioned hydroxybenzene compound, hydroxynaphthalene compound and quinone compound is caused to exist instead of the sulfur compound in the addition in divided portions.

According to the seventh or tenth invention, the molecular weight distribution of the resulting copolymer or hydrogenated product of the copolymer can further be sharpened by causing at least one compound selected from the group consisting of the hydroxybenzene compound, the hydroxynaphthalene compound and the quinone compound to exist when the mixture is added to the solvent in divided portions.

The thus-obtained copolymer of (di)cyclopentadiene and the vinyl-substituted aromatic compound in the fifth invention and the hydrogenated product of the copolymer in the eighth invention have, as noted above, the Mw/Mn ratio of less than 1.9 (from 1.75 to 1.89 in Examples to be described later), and the molecular weight distribution is thus more sharpened.

The copolymer in the first invention and the hydrogenated product thereof in the third invention have the Mw/Mn ratio of 2.5 or less which is lower than that of the conventional ones, providing a sharp molecular weight distribution.

Accordingly, the copolymer in the first invention and the hydrogenated product thereof in the third invention are substrates which are quite useful in the production of a tackifier and an adhesive.

The copolymer or the hydrogenated product thereof having such a sharp molecular weight distribution can efficiently be produced by the process in the second or fourth invention.

Further, the copolymer or the hydrogenated product thereof having the lower Mw/Mn ratio of less than 1.9 with the sharper molecular weight distribution as described in the fifth or eighth invention can efficiently be produced by the processes in the sixth and seventh inventions or the processes in the ninth and tenth inventions.

In the process of the sixth or ninth invention, the sulfur compound is caused to exist in adding the starting monomers to the solvent in divided portions, making it possible to more reduce the amount of the solvent to be used. Accordingly, in comparison with the polymerization conducted by increasing only the amount of the solvent, a resin having a sharp molecular weight distribution and an excellent performance is obtained with the use of the small amount of the solvent. Consequently, there is no fear that the productivity might be decreased by decreasing the amounts of the starting monomers to be charged into the polymerization vessel.

Also in the process of the seventh or tenth invention, at least one compound selected from the group consisting of the hydroxybenzene compound, the hydroxynaphthalene compound and the quinone compound is caused to exist in adding the starting monomers to the solvent in divided portions, making it possible to reduce the amount of the solvent to be used. Accordingly, in comparison with the polymerization conducted by increasing only the amount of the solvent, a resin having a sharp molecular weight distribution and an excellent performance is obtained with the use of the small amount of the solvent. Consequently, there is no fear that the productivity might be decreased by decreasing the amounts of the starting monomers to be charged into the polymerization vessel.

EXAMPLES

The present invention is illustrated more specifically by referring to the following Examples. However, the present invention is not limited thereto at all.

Example 1
Production of a Copolymer of Dicyclopentadiene and Styrene

Xylene (141 g, 180 parts by weight per 100 parts by weight of starting monomers) as a solvent was charged into a 300-milliliter polymerization vessel which had been purged with nitrogen and was fitted with a stirrer. While the solvent was heated to 260° C. with stirring, a mixture of 31 g of dicyclopentadiene and 47 g of styrene (weight ratio of 40:60) was added thereto in divided portions over the course of 2 hours. Then, the copolymerization was further continued for 5 hours.

After the completion of the reaction, the reaction solution was taken out, and treated with a rotary evaporator at a temperature of 200° C. and a pressure of 10 mmHg for 3 hours to remove unreacted monomers and xylene. In this manner, 70 g of a copolymer of dicyclopentadiene and styrene were obtained.

The properties of this copolymer are shown in Table 1.

Example 2
Production of a Hydrogenated Copolymer of Dicyclopentadiene and Styrene Sixty grams of cyclohexane as a solvent, 65 g of the copolymer obtained in Example 1 and 2.3 g of a silica-alumina catalyst supporting 0.5% by weight of palladium were charged into a 300-milliliter polymerization vessel which had been purged with nitrogen and was fitted with stirrer. The hydrogenation was conducted at a hydrogen pressure of 40 kg/cm$^2$G and a temperature of 230° C. for 3 hours.

After the completion of the reaction, the reaction solution was taken out, and treated with a rotary evaporator at a temperature of 200° C. and a pressure of 10 mmHg for 1 hour to remove cyclohexane. In this manner, 65 g of a hydrogenated product of a copolymer of dicyclopentadiene and styrene were obtained.

The properties of the hydrogenated product of the copolymer are shown in Table 1.

Comparative Example 1
Production of a Copolymer of Dicyclopentadiene and Styrene Xylene (50 g, 32 parts by weight per 100 parts by weight of starting monomers) as a solvent was charged into a 300-milliliter polymerization vessel which had been purged with nitrogen and was fitted with a stirrer. While the solvent was heated to 260° C. with stirring, a mixture of 62 g of dicyclopentadiene and 94 g of styrene (weight ratio of 40:60) was added thereto in divided portions over the course of 2 hours. Then, the copolymerization was further continued for 1.5 hours.

The resulting product was treated in the same manner as in Example 1 to remove unreacted monomers and xylene. In this manner, 140 g of a copolymer of dicyclopentadiene and styrene were obtained.

The properties of this copolymer are shown in Table 1.

Comparative Example 2
Production of a Hydrogenated Product of a Copolymer of Dicyclopentadiene and Styrene Example 2 was repeated except that the copolymer obtained in Comparative Example 1 was used instead of the copolymer obtained in Example 1 to form a hydrogenated product of a copolymer of dicyclopentadiene and styrene.

The properties of the hydrogenated copolymer are shown in Table 1.

Example 3
Production of a Copolymer of Dicyclopentadiene and Styrene in the Presence of a Sulfur Compound Xylene (330 g, 90 parts by weight per 100 parts by weight of starting monomers) as a solvent was charged into a 1-liter polymerization vessel which had been purged with nitrogen and was fitted with a stirrer. To xylene were added 3.66 g (1 part by weight per 100 parts by weight of starting monomers) of 2-methyl-5-tert-butylthiophenol. The mixture was heated to 260° C., and with stirring, a mixture of 183 g of dicyclopentadiene and 183 g of styrene (weight ratio of 50:50) as starting monomers was added thereto in divided portions over the course of 3 hours. Then, the copolymerization was further continued for 7 hours.

After the completion of the reaction, the reaction solution was taken out, and treated with a rotary evaporator at a temperature of 200° C. and a pressure of 10 mmHg for 2 hours to remove unreacted monomers and xylene. In this manner, 330 g of a copolymer of dicyclopentadiene and styrene were obtained.

Figure 3:
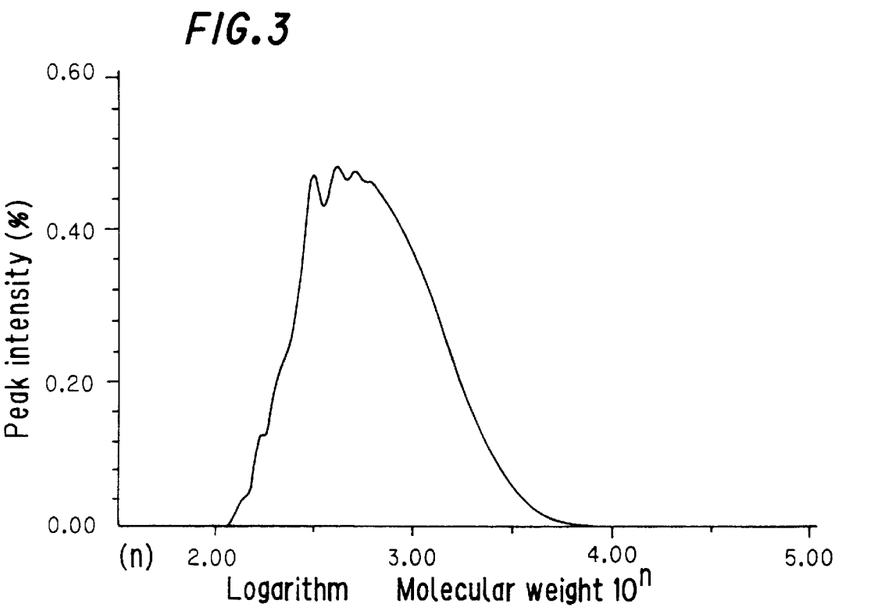
FIG. 3 is a pattern of a molecular weight distribution, as measured by GPC, of a copolymer in the present invention obtained in Example 3.

The properties of this copolymer are shown in Table 1. The pattern of the molecular weight distribution measured by GPC is shown in FIG. 3.

Example 4
Production of a Hydrogenated Product of a Copolymer of Dicyclopentadiene and Styrene in the Presence of a Sulfur Compound Seventy grams of cyclohexane as a solvent, 70 g of the copolymer obtained in Example 3 and 10 g of a nickel catalyst were charged into a 300-milliliter polymerization vessel which had been purged with nitrogen and was fitted with a stirrer. The hydrogenation was conducted at a temperature of 230° C. and a hydrogen pressure of 40 kg/cm$^2$G for 4 hours.

After the completion of the reaction, the reaction solution was taken out, and treated with a rotary evaporator at a temperature of 200° C. and a pressure of 10 mmHg for 1 hour to remove a solvent, i.e. cyclohexane. Thus, 70 g of a hydrogenated copolymer of dicyclopentadiene and styrene were obtained.

The properties of the hydrogenated copolymer are shown in Table 1.

Example 5
Production of a Copolymer Using a Pyrogallol

Xylene (330 g, 90 parts by weight per 100 parts by weight of starting monomers) as a solvent was charged into a 1-liter polymerization vessel which had been purged with nitrogen and was fitted with a stirrer. To xylene were added 3.66 g (1 part by weight per 100 parts by weight of starting monomers) of pyrogallol. Then, the solution was heated to 240° C., and with stirring, a mixture of 183 g of dicyclopentadiene and 183 g of styrene (weight ratio of 50:50) as starting monomers was added thereto in divided portions over the course of 90 minutes. Subsequently, the temperature was elevated to 260° C. over the course of 60 minutes. After the temperature reached 260° C., the copolymerization was further continued for 3 hours.

Figure 4:
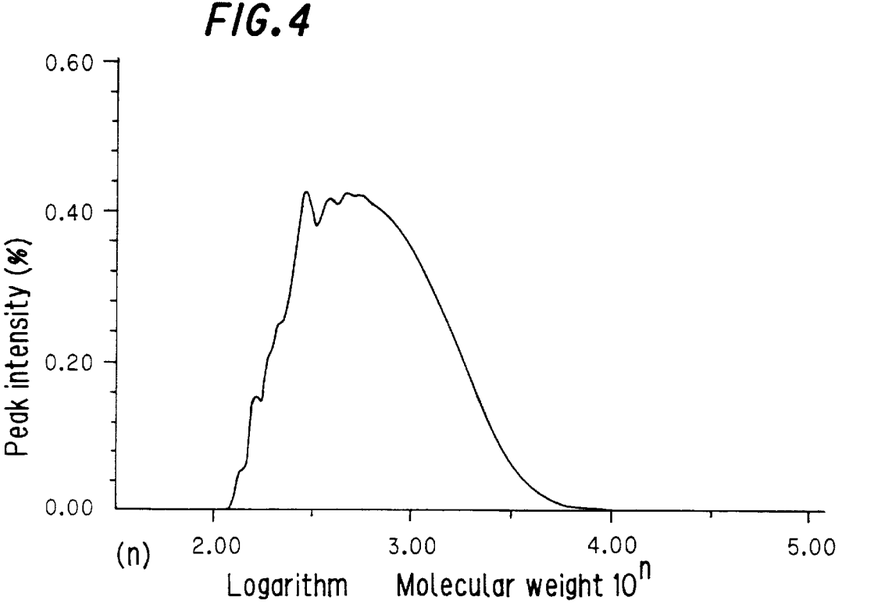
FIG. 4 is a pattern of a molecular weight distribution, as measured by GPC, of the copolymer obtained in Example 5.

After the completion of the reaction, the reaction solution was taken out, and treated with a rotary evaporator at a temperature of 200° C. and a pressure of 10 mmHg for 2 hours to remove unreacted monomers and xylene. In this manner, 330 g of a copolymer of dicyclopentadiene and styrene were obtained. The properties of the copolymer are shown in Table 1. The pattern of the molecular weight distribution measured by GPC is shown in FIG. 4.

Example 6
Production of a Hydrogenated Product of the Copolymer in Example 5

Seventy grams of cyclohexane as a solvent, 70 g of the copolymer obtained in Example 5 and 1.5 g of a nickel catalyst were charged into a 300-milliliter polymerization vessel which had been purged with nitrogen and was fitted with a stirrer, and the hydrogenation was conducted at a temperature of 230° C. and a hydrogen pressure of 40 kg/cm$^2$G for 4 hours.

After the completion of the reaction, the reaction solution was taken out, and treated with a rotary evaporator at a temperature of 200° C. and a pressure of 10 mmHg for 1 hour to remove cyclohexane. In this manner, 70 g of the hydrogenated product of the copolymer of dicyclopentadiene and styrene were obtained. The properties of this hydrogenated product of the copolymer are shown in Table 1.

Example 7
Production of a Copolymer using Catechol

Xylene (380 g, 120 parts by weight per 100 parts by weight of starting monomers) as a solvent was charged into a 1-liter polymerization vessel which had been purged with nitrogen and was fitted with a stirrer. To xylene were added 3.17 g (1 part by weight per 100 parts by weight of starting monomers) of catechol. The solution was then heated to 240° C., and with stirring, a mixture of 158 g of dicyclopentadiene and 158 g of styrene (weight ratio of 50:50) as starting monomers were added thereto in divided portions over the course of 90 minutes. Subsequently, the temperature was elevated to 260° C. over the course of 60 minutes. After the temperature reached 260° C, the copolymerization was further continued for 4 hours.

Figure 5:
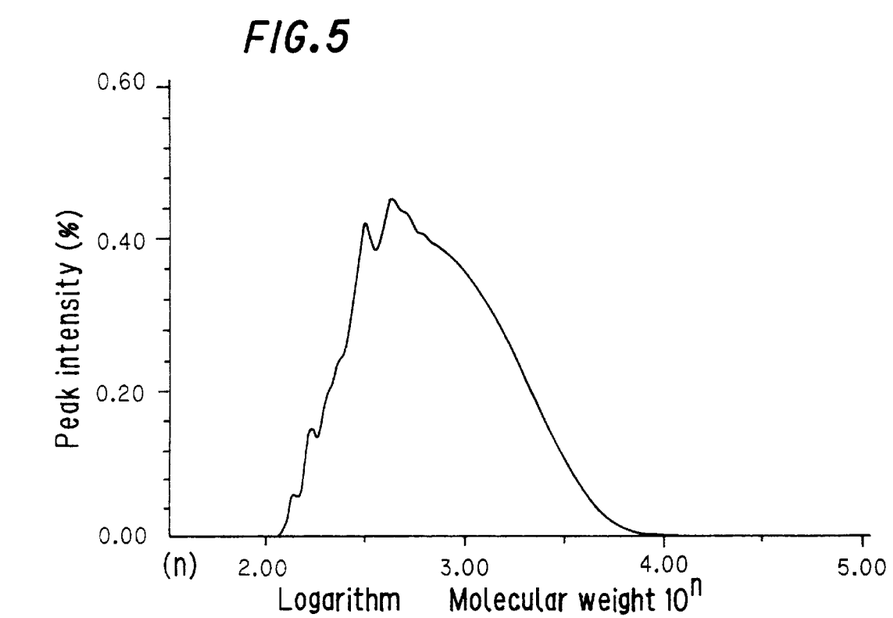
FIG. 5 is a pattern of a molecular weight distribution, as measured by GPC, of the copolymer obtained in Example 7.

After the completion of the reaction, the treatment was conducted as in Example 5 to obtain 280 g of a copolymer of dicyclopentadiene and styrene. The properties of this copolymer are shown in Table 1. The pattern of the molecular weight distribution measured by GPC is shown in FIG. 5.

Example 8
Production of a Hydrogenated Product of the Copolymer in Example 7

Example 6 was repeated except that the copolymer formed in Example 7 was used to obtain 70 g of a hydrogenated product of a copolymer of dicyclopentadiene and styrene. The properties of this hydrogenated product of the copolymer are shown in Table 1.

Example 9
Production of a Copolymer using Hydroxyhydroquinone

Figure 6:
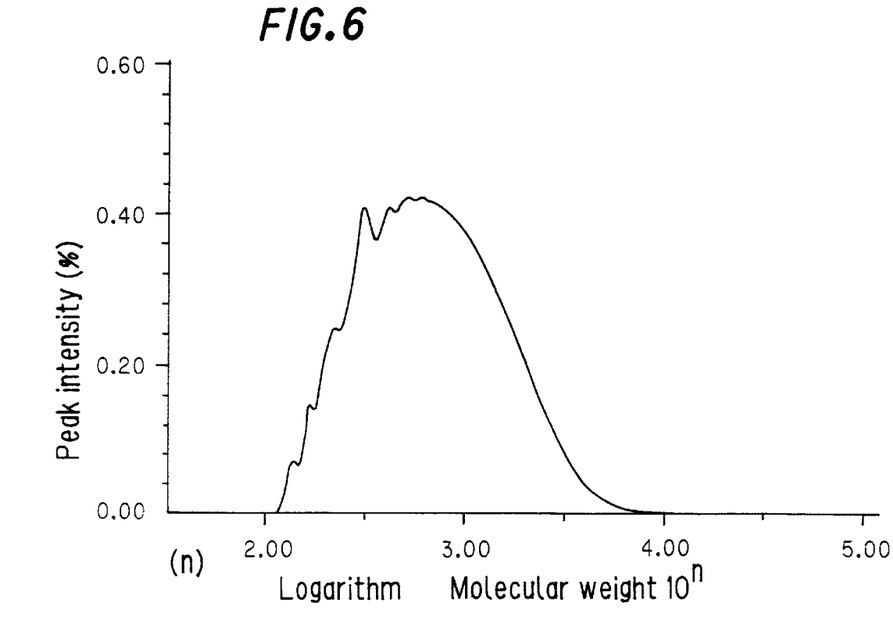
FIG. 6 is a pattern of a molecular weight distribution, as measured by GPC, of the copolymer obtained in Example 9.

Example 7 was repeated except that 3.17 g (1 part by weight per 100 parts by weight of starting monomers) of hydroxyhydroquinone were used instead of 3.17 g of catechol. In this manner, 282 g of a copolymer of dicyclopentadiene and styrene were obtained. The properties of this copolymer are shown in Table 1. The pattern of the molecular weight distribution measured by GPC is shown in FIG. 6.

Example 10
Production of a Hydrogenated Product of the Copolymer in Example 9

Example 6 was repeated except that the copolymer formed in Example 9 was used to obtain 70 g of a hydrogenated product of the copolymer of dicyclopentadiene and styrene. The properties of this hydrogenated product of the copolymer are shown in Table 1.

Example 11
Production of a Copolymer using p-tert-butylcatechol

Figure 7:
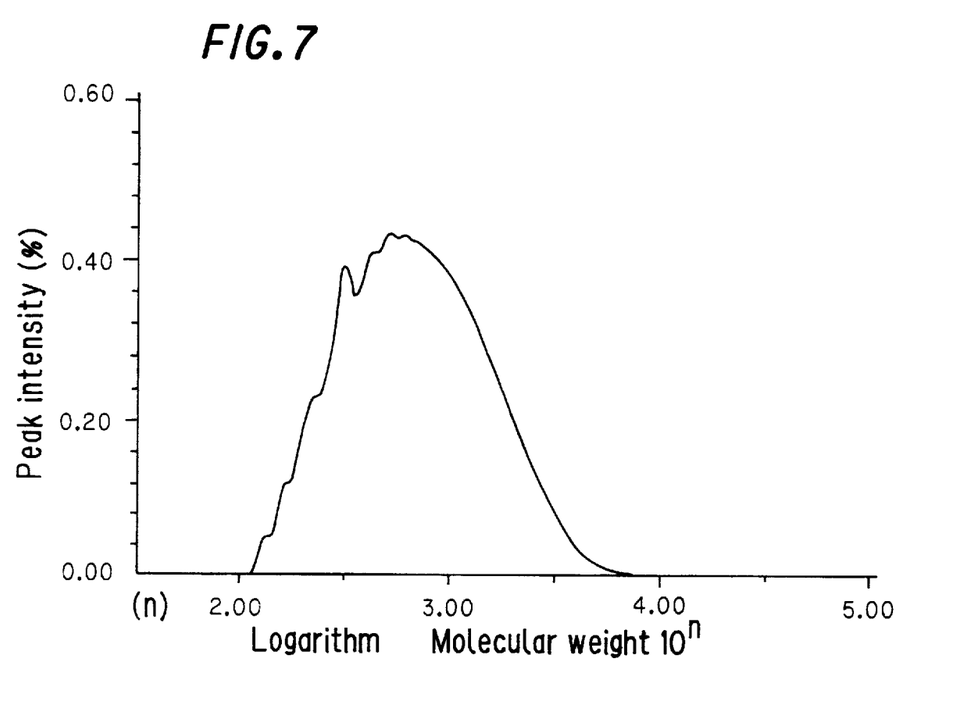
FIG. 7 is a pattern of a molecular weight distribution, as measured by GPC, of the copolymer obtained in Example 11.

Example 7 was repeated except that 6.34 g (2 parts by weight per 100 parts by weight of starting monomers) of p-tert-butylcatechol were used instead of 3.17 g of catechol to obtain 282 g of a copolymer of dicyclopentadiene and styrene. The properties of this copolymer are shown in Table 1. The pattern of the molecular weight distribution measured by GPC is shown in FIG. 7.

Example 12
Production of a Hydrogenated Product of the Copolymer in Example 11

Example 6 was repeated except that the copolymer formed in Example 11 was used to obtain 70 g of a hydrogenated product of the copolymer of dicyclopentadiene and styrene. The properties of this hydrogenated product of the copolymer are shown in Table 1.

TABLE 1

|  | Examples | | Comparative Examples | | Examples | | | | | | | | | |
| --- | --- | --- | --- | --- | --- | --- | --- | --- | --- | --- | --- | --- | --- | --- |
|  | 1 | 2 | 1 | 2 | 3 | 4 | 5 | 6 | 7 | 8 | 9 | 10 | 11 | 12 |
| Softening point (° C.)*1 | 72 | 92 | 71 | 92 | 75 | 97 | 84 | 94 | 79 | 96 | 80 | 93 | 82 | 97 |
| Vinyl-substituted aromatic compound content (wt. %)*2 | 55 | 17 | 54 | 18 | 45 | 12 | 45 | 20 | 43 | 23 | 43 | 19 | 46 | 18 |
| Bromine number (g/100 g)*3 | 55 | 6 | 55 | 4 | 55 | 5 | 60 | 8 | 60 | 9 | 62 | 8 | 59 | 5 |
| Number average molecular weight*4 | 670 | 700 | 610 | 620 | 590 | 640 | 580 | 620 | 590 | 660 | 610 | 630 | 570 | 670 |
| Mw/Mn ratio*5 | 2.0 | 1.9 | 2.8 | 2.7 | 1.67 | 1.63 | 1.81 | 1.83 | 1.89 | 1.89 | 1.80 | 1.77 | 1.79 | 1.75 |

*1 according to JAI 7-1991 (ring & ball method)
*2 measured with an infrared spectrophotometer (absorbance 700 cm$^{-1}$)
*3 according to JIS K-2605
*4 measured by VPO
*5 measured by GPC Table 1 reveals the following.

First, the Mw/Mn ratio of the copolymer obtained in Example 1 using a solvent at a specific weight ratio based on the starting monomers was 2.0. The Mw/Mn ratio of the hydrogenated product of the copolymer obtained by hydrogenating the above-mentioned copolymer as described in Example 2 was 1.9. Thus, these showed the desirable sharp molecular weight distributions.

Meanwhile, the Mw/Mn ratio of the copolymer obtained in Comparative Example 1 without consideration of the amount of the solvent to be used, unlike the Mw/Mn ratio of the copolymer in Example 1, was 2.8. The Mw/Mn ratio of the hydrogenated product of the copolymer obtained in Comparative Example 2 was 2.7. Thus, these did not show such desirable molecular weight distributions as in Examples 1 and 2.

The Mw/Mn ratio of the copolymer obtained in Example 3 through the copolymerization in the presence of the sulfur compound was 1.67. The Mw/Mn ratio of the hydrogenated product of the copolymer obtained by hydrogenating the above-mentioned copolymer as described in Example 4 was 1.63. They were of course lower than those in Comparative Examples 1 and 2, and were even lower than those in Examples 1 and 2.

Further, the Mw/Mn ratios of the copolymers obtained in Examples 5, 7, 9 and 11 through the copolymerization in the presence of the hydroxybenzene compound and of the hydrogenated products of the copolymers obtained in Examples 6, 8, 10 and 12 were all less than 1.9. They were of course lower than those in Comparative Examples 1 and 2, and were even lower than those in Examples 1 and 2.

From these facts, it is understood that as indicated in the first to fourth inventions, the process of the present invention can provide the copolymer and the hydrogenated product thereof having the Mw/Mn ratio of 2.5 or less, namely, the sharp molecular weight distribution upon using the solvent at the specific ratio based on the starting monomers.

Still further, it is understood that as indicated in the sixth and ninth inventions, the process of the present invention can provide the copolymer and the hydrogenated product thereof having the lower Mw/Mn ratio of less than 1.9 with the sharper molecular weight distribution by causing the sulfur compound to exist in adding the starting monomers to the solvent in divided portions.

Furthermore, it is understood that as shown in the processes of the seventh and tenth inventions, the copolymer and the hydrogenated product of the copolymer having the Mw/Mn ratio of less than 1.9 which is lower than that of the conventional ones, with the much lower molecular weight distribution can be obtained by causing the hydroxybenzene compound or the like to exist in adding the starting monomers to the solvent in divided portions.

In Examples 1 to 12, the same effects were obtained even when cyclopentadiene was used instead of dicyclopentadiene.

What is claimed:

1. A hydrogenated product of a copolymer of cyclopentadiene and/or dicyclopentadiene and a vinyl-substituted aromatic compound which is obtained by hydrogenating a copolymer of cyclopentadiene and/or dicyclopentadiene and a vinyl-substituted aromatic compound, said copolymer having a softening point of from 60 to 130° C., a vinyl-substituted aromatic compound content of from 30 to 90% by weight, a bromine number of from 30 to 90 g/100 g, a number average molecular weight of from 400 to 1,000 and a weight average molecular weight/number average molecular weight (Mw/Mn) ratio of 2.5 or less, said copolymer produced by conducting a thermal copolymerization while adding in divided portions a mixture of cyclopentadiene and/or dicyclopentadiene and a vinyl-substituted aromatic compound to a solvent, said solvent being in an amount of 50 to 500 parts by weight per 100 parts by weight in total of the cyclopentadiene and/or dicyclopentadiene and the vinyl-substituted aromatic compound, said hydrogenated product having a softening point of from 70 to 140° C., a vinyl-substituted aromatic compound content of from 0 to 35% by weight, a bromine number of from 0 to 30 g/100 g, a number average molecular weight of from 400 to 1,000 and a weight average molecular weight/number average molecular weight (Mw/Mn) ratio of 2.5 or less.

2. A process for producing the hydrogenated product of the copolymer of claim 1, which comprises conducting a thermal copolymerization while adding in divided portions a mixture of cyclopentadiene and/or dicyclopentadiene and a vinyl-substituted aromatic compound to a solvent, and then hydrogenating the copolymer to produce the hydrogenated product of a copolymer of cyclopentadiene and/or dicyclopentadiene and the vinyl-substituted aromatic compound, wherein said solvent is in an amount of from 50 to 500 parts by weight per 100 parts by weight in total of the cyclopentadiene and/or dicyclopentadiene and the vinyl-substituted aromatic compound.

3. A hydrogenated product of a copolymer of cyclopentadiene and/or dicyclopentadiene and a vinyl-substituted compound which is obtained by hydrogenating a copolymer of cyclopentadiene and/or dicyclopentadiene and a vinyl-substituted aromatic compound, said copolymer having a softening point of from 60 to 130° C., a vinyl-substituted aromatic compound content of from 30 to 90% by weight, a bromine number of from 30 to 90 g/100 g, a number average molecular weight of from 400 to 1,000, and a weight average molecular weight/number average molecular weight (Mw/Mn) ratio of less than 1.9, said copolymer produced by conducting a thermal copolymerization while adding in divided portions a mixture of cyclopentadiene and/or dicyclopentadiene and a vinyl-substituted aromatic compound to a solvent in the presence of a sulfur compound, said hydrogenated product having a softening point of from 70 to 140° C., a vinyl-substituted aromatic compound content of from 0 to 35% by weight, a bromine number of from 0 to 30 g/100 g, a number average molecular weight of from 400 to 1,000, and a weight average molecular weight/number average molecular weight (Mw/Mn) ratio of less than 1.9.

4. A process for producing the hydrogenated product of the copolymer of claim 3, which comprises conducting a thermal copolymerization while adding in divided portions a mixture of cyclopentadiene and/or dicyclopentadiene and a vinyl-substituted aromatic compound to a solvent in the presence of a sulfur compound, and then hydrogenating the copolymer to produce the hydrogenated product of a copolymer of cyclopentadiene and/or dicyclopentadiene and the vinyl-substituted aromatic compound.

5. A process for producing the hydrogenated product of the copolymer of claim 3, which comprises conducting a thermal copolymerization while adding in divided portions a mixture of cyclopentadiene and/or dicyclopentadiene and a vinyl-substituted aromatic compound to a solvent in the presence of at least one compound selected from the group consisting of a hydroxybenzene compound, a hydroxynaphthalene compound and a quinone compound, and then hydrogenating the copolymer to produce the hydrogenated product of a copolymer of cyclopentadiene and/or dicyclopentadiene and the vinyl-substituted aromatic compound.

6. The hydrogenated product of claim 1, wherein the copolymer has a softening point of 70 to 120° C., a vinyl-substituted aromatic compound content of 35 to 65% by weight, a bromine number of 30 to 70 g/100 g and a number average molecular weight of 500 to 800; and wherein the hydrogenated product has a softening point of 80 to 130° C., a vinyl-substituted aromatic compound content of 1 to 30% by weight, a bromine number of 1 to 20 g/100 g and a number average molecular weight of 500 to 800.

7. The hydrogenated product of claim 6, wherein the bromine number is 40 to 60 g/100 g.

8. The process of claim 2, wherein the solvent is at least one solvent selected from the group consisting of benzene, toluene, xylene, cyclohexane, methylcyclohexane and ethylcyclohexane; the solvent is at an initial temperature of 100° C. or more; and the solvent is in an amount of 80 to 300 parts per 100 parts by weight in total of the cyclopentadiene and/or dicyclopentadiene and the vinyl-substituted aromatic compound.

9. The process of claim 8, wherein a weight ratio of the cyclopentadiene and/or dicyclopentadiene to the vinyl-substituted aromatic compound is 70:30 to 20:80; the divided portions are added in a time period of 0.5 to 5 hours; and the copolymerization is conducted at a temperature of 200 to 350° C., a pressure of 0 to 20 kg/cm²G and a reaction time of 0.5 to 8 hours.

10. The process of claim 9, wherein the ratio is 60:40 to 40:60; the time period is 1 to 3 hours; and the copolymerization is conducted at a temperature of 250 to 300° C., a pressure of 0 to 15 kg/cm²G and a reaction time of 1 to 5 hours.

11. The hydrogenated product of claim 3, wherein the copolymer has a softening point of 70 to 120° C., a vinyl-substituted aromatic compound content of 40 to 60% by weight, a bromine number of 40 to 60 g/100 g and a number average molecular weight of 500 to 800; the hydrogenated product has a softening point of 80 to 130° C., a vinyl-substituted aromatic compound content of 1 to 30% by weight, a bromine number of 1 to 20 g/100 g and a number average molecular weight of 500 to 800.

12. The process of claim 4, wherein the sulfur compound is selected from the group consisting of n-octylmercaptan, benzylmercaptan, thiophenol and 2-methyl-5-tert-butylthiophenol; the sulfur compound is in an amount of 0.01 to 5 parts by weight per 100 parts by weight of the total of the cyclopentadiene and/or dicyclopentadiene and the vinyl-substituted aromatic compound; and the solvent is in an amount of 50 to 150 parts by weight per 100 parts by weight of the total of the cyclopentadiene and/or dicyclopentadiene and the vinyl-substituted aromatic compound.

13. The process of claim 5, wherein said at least one compound is selected from the group consisting of phenol, 2,6-di-tert-butyl-p-cresol, pentaeryrityltetrakis (3-(3,5-di-tert-butyl-4-hydroxyphenol)propionate), methoquinone, hydroquinone, 2,5-di-tert-butylhydroquinone, hydroxyhydroquinone, catechol, p-tert-butyl-catechol, pyrogallol, 1-4-dihydroxynaphthalene, 2,3-dihydroxynaphthalene, 2,4-dihydroxynaphthalene, 2,6-dihydroxynaphthalene, 3,4-dihydroxynaphthalene, 1,4-benzoquinone, α-naphthoquinone, anthraquinone and 1,4-dihydroxyanthraquinone; said at least one compound is in an amount of 0.01 to 5 parts by weight per 100 parts by weight of the cyclopentadiene and/or dicyclopentadiene and the vinyl-substituted aromatic compound.

14. A hydrogenated product of a copolymer of cyclopentadiene and/or dicyclopentadiene and a vinyl-substituted compound which is obtained by hydrogenating a copolymer of cyclopentadiene and/or dicyclopentadiene and a vinyl-substituted aromatic compound, said copolymer having a softening point of from 60 to 130° C., a vinyl-substituted aromatic compound content of from 30 to 90% by weight, a bromine number of from 30 to 90 g/100 g, a number average molecular weight of from 400 to 1,000, and a weight average molecular weight/number average molecular weight (Mw/Mn) ratio of less than 1.9, said copolymer produced by conducting a thermal copolymerization while adding in divided portions a mixture of cyclopentadiene and/or dicyclopentadiene and a vinyl-substituted aromatic compound to a solvent in the presence of at least one compound selected from the group consisting of a hydroxybenzene compound, a hydroxynaphthalene compound and a quinone compound, said hydrogenated product having a softening point of from 70 to 140° C., a vinyl-substituted aromatic compound content of from 0 to 35% by weight, a bromine number of from 0 to 30 g/100 g, a number average molecular weight of from 400 to 1,000, and a weight average molecular weight/number average molecular weight (Mw/Mn) ratio of less than 1.9.

* * * * *